(12) United States Patent
Bhatnagar et al.

(10) Patent No.: US 10,826,601 B2
(45) Date of Patent: Nov. 3, 2020

(54) OPTICAL SWITCH WITH PATH CONTINUITY MONITORING FOR OPTICAL PROTECTION SWITCHING

(71) Applicant: Ciena Corporation, Hanover, MD (US)

(72) Inventors: Vipul Bhatnagar, Kensington, MD (US); Paul Chedore, Ottawa (CA); Choudhury A. Al Sayeed, Stittsville (CA); Scott Kohlert, Nepean (CA); David C. Bownass, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/248,882

(22) Filed: Jan. 16, 2019

(65) Prior Publication Data

US 2020/0228197 A1    Jul. 16, 2020

(51) Int. Cl.
*H04B 10/032* (2013.01)
*H04B 10/25* (2013.01)
*H04Q 11/00* (2006.01)

(52) U.S. Cl.
CPC .......... *H04B 10/032* (2013.01); *H04B 10/25* (2013.01); *H04Q 11/0062* (2013.01); *H04Q 2011/0081* (2013.01); *H04Q 2011/0083* (2013.01)

(58) Field of Classification Search
None
See application file for complete search history.

(56) References Cited

U.S. PATENT DOCUMENTS

| | | | | |
|---|---|---|---|---|
| 5,933,258 A | * | 8/1999 | Flanagan | H04B 10/032 370/222 |
| 6,341,032 B1 | * | 1/2002 | Fukashiro | H01S 3/0014 359/337 |
| 6,697,576 B1 | * | 2/2004 | Rollins | H04B 10/67 398/159 |

(Continued)

FOREIGN PATENT DOCUMENTS

| | | | |
|---|---|---|---|
| DE | 19830734 A1 | * 1/2000 | H04J 14/0289 |
| EP | 0 779 718 A2 | 6/1997 | |

OTHER PUBLICATIONS

Islam, Mohammed N., Raman Amplifiers for Telecommunications 2: Sub-Systems and Systems, Springer-Verlag, 2004, pp. 470-473 (Year: 2004).*

(Continued)

*Primary Examiner* — Jai M Lee
(74) *Attorney, Agent, or Firm* — Clements Bernard Walker; Lawrence A. Baratta, Jr.; Christopher L. Bernard

(57) ABSTRACT

An Optical Protection Switch (OPS) includes a splitter connected to a transmitted input and a path continuity monitor transmitter and configured to output the transmitted input with a path continuity monitor signal to two paths; a switch connected to a receiver output and configured to provide one of two receiver inputs each from one of the two paths based on a setting of the switch; and one or more path continuity monitor receivers connected to the two receiver inputs and configured to detect a corresponding path continuity monitor signal from a complementary OPS, wherein the setting of the switch is set based upon the received path continuity monitor signals. The one or more path continuity monitor receivers each have a narrow optical bandwidth relative to an overall optical bandwidth of the transmitted input.

20 Claims, 17 Drawing Sheets

(56) References Cited

U.S. PATENT DOCUMENTS

| | | | | |
|---|---|---|---|---|
| 7,174,096 B2* | 2/2007 | Berthold | H04B 10/2503 | 398/1 |
| 8,078,052 B2* | 12/2011 | Aprile | H04J 14/029 | 398/15 |
| 8,160,453 B1* | 4/2012 | Harley | H04B 10/032 | 398/158 |
| 8,204,375 B1* | 6/2012 | Lee | H04B 10/032 | 398/16 |
| 9,485,014 B2* | 11/2016 | Ichimura | H04B 10/071 | |
| 10,063,313 B1* | 8/2018 | Al Sayeed | H04J 14/029 | |
| 2001/0046074 A1* | 11/2001 | Kakizaki | H04J 14/0294 | 398/5 |
| 2002/0048060 A1* | 4/2002 | Laham | H04Q 11/0005 | 398/33 |
| 2003/0161629 A1* | 8/2003 | Frascolla | H04Q 11/0062 | 398/5 |
| 2004/0037556 A1* | 2/2004 | Matz | H04J 14/0246 | 398/40 |
| 2004/0085895 A1* | 5/2004 | Zettinger | H04L 1/22 | 370/220 |
| 2004/0096216 A1* | 5/2004 | Ito | H04B 10/0775 | 398/33 |
| 2004/0114925 A1* | 6/2004 | Berthold | H04J 14/0294 | 398/45 |
| 2004/0175171 A1* | 9/2004 | Kokkinos | H04B 10/00 | 398/14 |
| 2004/0190905 A1* | 9/2004 | Kano | H04J 14/0227 | 398/141 |
| 2005/0141892 A1* | 6/2005 | Park | H04J 14/0297 | 398/71 |
| 2007/0138417 A1* | 6/2007 | Sugiyama | H04B 10/032 | 250/551 |
| 2007/0297795 A1* | 12/2007 | Kinoshita | H04B 10/032 | 398/41 |
| 2008/0120524 A1* | 5/2008 | Sylvester | H04L 43/10 | 714/704 |
| 2008/0152341 A1* | 6/2008 | Hung | H04J 14/0295 | 398/2 |
| 2008/0166122 A1* | 7/2008 | Hsiao | H04B 10/032 | 398/48 |
| 2009/0226163 A1* | 9/2009 | Sugahara | H04B 10/077 | 398/17 |
| 2010/0119223 A1* | 5/2010 | Ferrari | H04B 10/0773 | 398/4 |
| 2011/0200324 A1* | 8/2011 | Boertjes | H04J 14/0212 | 398/16 |
| 2011/0236016 A1 | 9/2011 | Nagamine | | |
| 2013/0051809 A1* | 2/2013 | Mehrvar | H04B 10/6161 | 398/208 |
| 2013/0294762 A1* | 11/2013 | Nonaka | H04B 10/275 | 398/2 |
| 2013/0343757 A1* | 12/2013 | Wigley | H04B 10/032 | 398/45 |
| 2014/0119722 A1* | 5/2014 | Ichimura | H04B 10/032 | 398/16 |
| 2014/0193146 A1* | 7/2014 | Lanzone | H04B 10/032 | 398/2 |
| 2015/0365317 A1* | 12/2015 | Wang | H04B 10/25133 | 398/16 |
| 2017/0019166 A1* | 1/2017 | Yadlowsky | H04B 10/2504 | |
| 2017/0122812 A1* | 5/2017 | Bhatnagar | G01J 3/50 | |

OTHER PUBLICATIONS

Apr. 24, 2020 International Search Report and Written Opinion for International Application No. PCT/US2020/012104.

\* cited by examiner

OPTICAL SWITCH WITH PATH CONTINUITY MONITORING FOR OPTICAL PROTECTION SWITCHING

FIELD OF THE DISCLOSURE

The present disclosure generally relates to optical networking systems and methods. More particularly, the present disclosure relates to systems and methods for an optical switch with path continuity monitoring for optical protection switching.

BACKGROUND OF THE DISCLOSURE

Protection switching in optical networks enables redundancy and resiliency to fiber cuts or other failures. For example, optical links can be disrupted if an associated cable is damaged or fails. A 1+1 protection scheme is used to make an optical link survivable. In a 1+1 optical protection scheme, the transmitted signal is broadcast on two independent paths (i.e., diverse paths). A tail-end switch selects one of the two paths for reception. The commonly-used selection criteria for switch configuration is to choose a path for which the received power level is deemed acceptable. For example, if the selected path's received power is zero and the alternate path exceeds a pre-determined threshold, the switch can select the alternate path. In amplified optical links, the technique used for distinguishing a failed path from an acceptable path described above (switch when selected path's Rx power goes to zero) does not work. A path failure may not cause the received power to go to zero because each of the amplifiers downstream of the path failure point generates optical-domain noise (Amplified Stimulated Emission (ASE)). The switch's power monitor may not detect a path failure for as long as the residual amplifier noise persists on the link. Inherent in the 1+1 protection scheme is that each tail-end switch operates independently of the other. A unidirectional path failure can cause each traffic flow to go over different paths (direction 1 on path 1, direction 2 on path 2), which may be undesirable. A bidirectional switch synchronizes the two tail-end switches so that they select the same path.

Commonly-assigned U.S. Pat. No. 10,063,313, issued Aug. 28, 2018, and entitled "Synchronization of optical protection switching and loading of path specific characteristics," the contents of which are incorporated herein by reference, describes a unique messaging framework between two OPS protected nodes against fiber path faults so that the fiber protection switching between the two nodes will always remain synchronized to the same fiber path. Implementation of this solution requires a fast-signaling path between the OSC transceivers at amplifier sites downstream of the path failure and between the terminating OSC and the optical protection switch at the link termination point in order to switch away from the failed path quickly. Such a fast-signaling path may not always be available.

BRIEF SUMMARY OF THE DISCLOSURE

In an embodiment, an Optical Protection Switch (OPS) includes a splitter connected to a transmitted input and a path continuity monitor transmitter and configured to output the transmitted input with a path continuity monitor signal to two paths; a switch connected to a receiver output and configured to provide one of two receiver inputs each from one of the two paths based on a setting of the switch; and one or more path continuity monitor receivers connected to the two receiver inputs and configured to detect a corresponding path continuity monitor signal from a complementary OPS, wherein the setting of the switch is based upon the received path continuity monitor signals. The one or more path continuity monitor receivers can each have a narrow optical bandwidth relative to an overall optical bandwidth of the transmitted input. The one or more path continuity monitor receivers can include a narrowband optical filter, thereby lowering noise contribution to overall received power. The one or more path continuity monitor receivers can be two receivers, one each connected to the two receiver inputs. The path continuity monitor signal can be at a wavelength within a gain bandwidth of an optical amplifier but outside of data-bearing channels. The setting of the switch can be set to switch based on a detected loss of the corresponding path continuity monitor signal.

The path continuity monitor transmitter and the one or more path continuity monitor receivers can be configured to carry data on associated wavelengths with the complementary OPS. Subsequent to a switch, the path continuity monitor transmitter can be configured to communicate the switch to the complementary OPS for synchronization of paths using an in-band communication signal. The Optical Protection Switch (OPS) can further include an optical filter on the transmitted input to block an upstream path continuity monitor signal. The nested configuration can support 1:N protection for N fiber paths with N−1 OPS pairs. The OPS can be in an outer stage of the nested configuration, and the one or more path continuity monitor receivers can be configured to receive a path continuity monitor signal from inner stages of the nested configuration. A corresponding path continuity monitor signal for each stage in the nested configuration can have unique modulation or frequencies for identification thereof.

In another embodiment, a method of optical protection switching with an Optical Protection Switch (OPS) includes, in the OPS which includes a splitter on a transmit side to both a first fiber path and a second fiber path and a receive switch on a receive side with the receive switch set to only one of the first fiber path and the second fiber path, receiving a path continuity monitor signal at one or more path continuity monitor receivers from a complementary OPS; and based on one of a loss of the path continuity monitor signal and data contained from the path continuity monitor signal, causing a switch of the receive switch.

In a further embodiment, a nested Optical Protection Switch (OPS) system includes N−1 OPS pairs providing 1:N protection for N fiber paths, and each OPS including a splitter connected to a transmitted input and a path continuity monitor transmitter and configured to output the transmitted input with a path continuity monitor signal to two paths, wherein any upstream path continuity monitor signal is blocked on the transmitter input; a switch connected to a receiver output and configured to provide one of two receiver inputs each from one of the two paths based on a setting of the switch; and one path continuity monitor receiver connected to each of the receiver inputs and configured to detect a corresponding path continuity monitor signal from a complementary OPS, wherein the setting of the switch is set based on the corresponding path continuity monitor signal.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to systems and methods for an optical switch with path continuity monitoring for optical protection switching. The systems and methods described herein include the use of a continuity monitor (e.g., a pilot tone) for messaging between complementary Optical Protection Switches (OPSs). The continuity monitor approach enables a 50 ms protection switch for both directions for a unidirectional fiber cut, using a modulated (or unmodulated) continuity monitor embedded in the OPS unit to notify the far end switch and/or of a fiber cut. The continuity monitor uses an in-band communication signal and hence, removes the dependency on messaging such as over the OSC. This continuity monitor approach can achieve a fast (≤50 ms) and bi-directional protection switching for a cascaded (nested) OPS configuration such as for 1:N fiber protection, where N>2. This approach is achieved by transmitting individual communication signals or a pilot tone from each protection stage and blocking the transmit signal from outer stages to inner stages. Advantageously, the continuity monitor approach for an OPS can be used in metro and data center interconnect (DCI) photonic transport applications for an efficient, robust, and fast protection mechanism. Also, the continuity monitor approach allows for fast path failure detection on an amplified link.

Additionally, the OPSs can be deployed in multi-span (amplified) links including different numbers of links between working and protection lines. With the path continuity monitoring, the detection of a path failure is independent of other system components and characteristics (e.g., OSC, channel loading, OSNR, etc.). This allows for rapid, definitive detection of path continuity failures in various environments. The path continuity monitor can support a dedicated communications link between the complementary protection switches, which enables their respective path selections to be synchronized. This path continuity monitor is designed to traverse multi-span (amplifier) links, without impacting the signal band to provide a plug-and-play solution that does not require any application-specific engineering or provisioning.

Conventional OPS System

Figure 1:
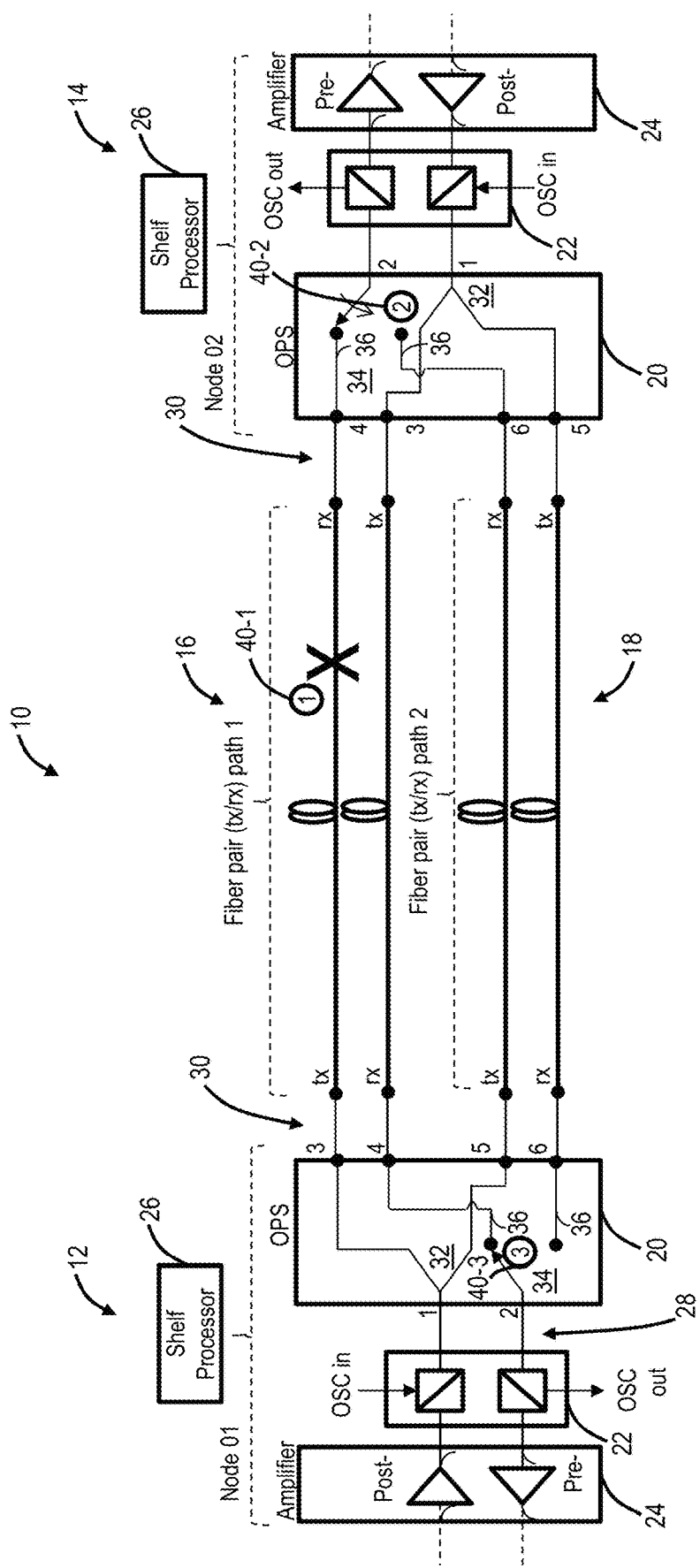
FIG. 1 is a network diagram of an optical network with OPS protected fiber spans between two nodes.

FIG. 1 is a block diagram of an optical network 10 with OPS protected fiber spans between two nodes 12, 14. The two nodes 12, 14 are interconnected by two fiber pairs, denoted as path 1 16, path 2 18. The paths 16, 18 can be diverse, even of differing lengths with intermediate equipment such as optical amplifiers (omitted in FIG. 1). The nodes 12, 14, each include an OPS 20, an Optical Supervisory Channel (OSC) 22, an amplifier 24, and a shelf processor 26. For illustration purposes, the optical transceivers which connect to the amplifiers 24 (either directly or through DWDM multiplexing equipment) are omitted. The amplifiers 24 can be Erbium-Doped Fiber Amplifiers (EDFAs) or the like, acting as a post-amplifier on a transmit side and a pre-amplifier on a receive side. The OSC 22 can be an out-of-band (from the amplifier and/or from the DWDM channels) wavelength which provides Operations, Administration, Maintenance, and Provisioning (OAM&P) communication. For example, the OSC 22 can be 1510 nm, 1625 nm, or the like. The OSC wavelength is added/dropped with filters in the OSC 22. Also, the OSC 22 can include transceiver components to enable the OSC wavelength and electrical components for modulating/demodulating the OSC wavelength.

Thus, after the optical transceivers (not shown), the amplifier 24, and the OSC 22, there is a single pair of signals 28—TX and RX—which interface the OPS 20. Functionally, the OPS 20 takes the single pair of signals 28 and presents two pairs of signals 30, one for each of the paths 16, 18. Thus, the function of optical protection is to interface an ensemble of transceivers with optical line protection over the paths 16, 18. To support this optical protection, on the transmit side, the OPS 20 includes a splitter 32 which splits the transmit signal from the signals 28 to fibers in each of the paths 16, 18. Thus, the OPS 20 includes transmitting actively over both of the paths 16, 18. On the receive side, the OPS 20 includes a switch 34 which selects only one fiber from each of the paths 16, 18 based on a monitoring port 36. Specifically, a Loss of Light (LOL) on the monitoring port 36 causes the switch 34 to toggle.

In operation, when a fiber cut takes place on the active fiber path (step 40-1), the active OPS RX port at the node 14, where the switch is currently set (e.g. port #4 for the signals 30) goes into a loss of light (LOL) state, the OPS 20 does an automatic switch to the other RX port (e.g. port #6 for the signals 30) (step 40-2). However, in the reverse direction, since the node 12's OPS 20 active RX port #4 does not experience a LOL condition, the switch remains set at its current location (port #4) (step 40-3). That brings the switch ports at both ends switched at different fiber paths 16, 18 which may be undesirable for either performance reasons (e.g., link latency differs for each direction of signal flow) or maintenance reasons (network operator may prefer that traffic is automatically switched to path 18 so that repairs can be made to path 16 without further disruption of network traffic).

Example OPS Network for Data Center Interconnection

Figure 2:
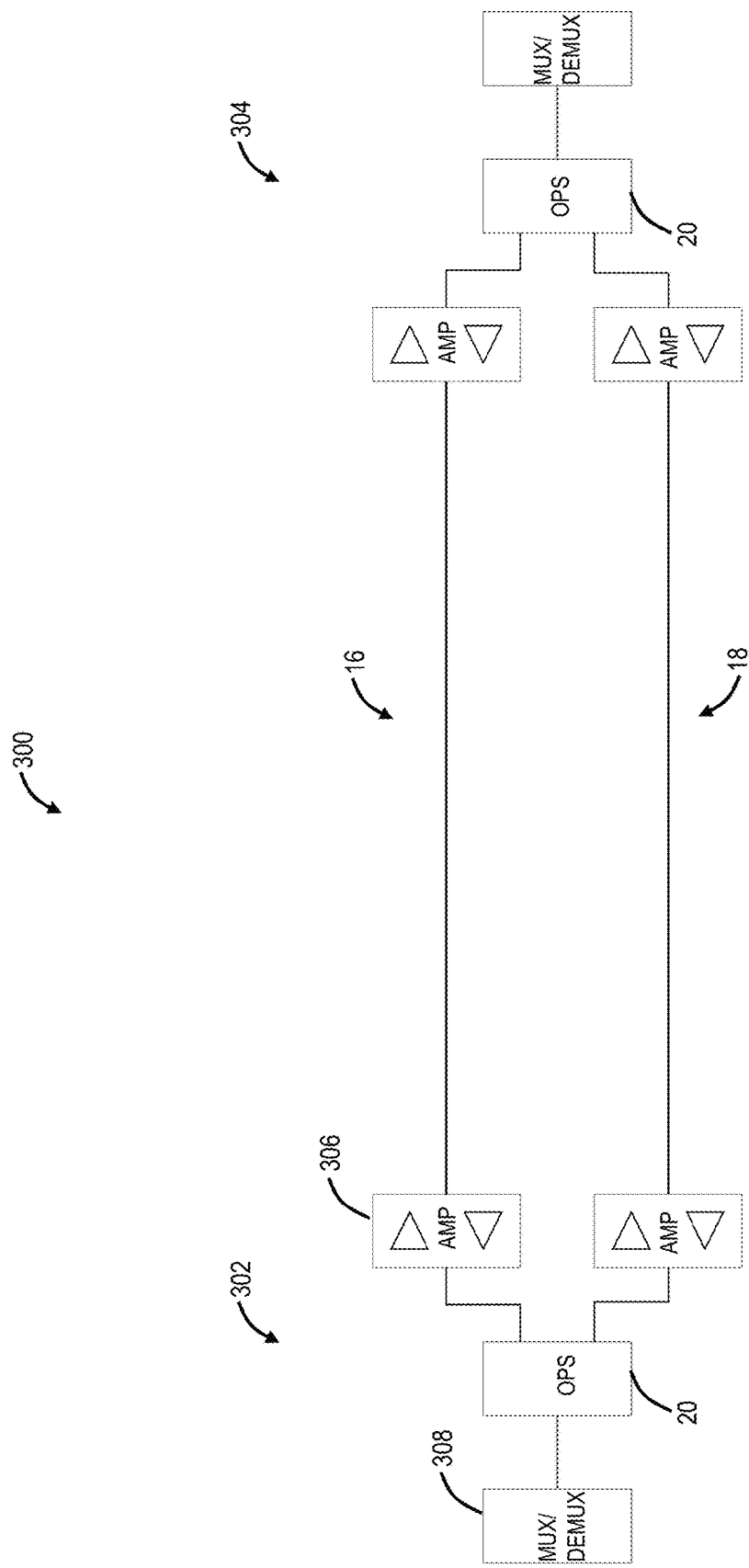
FIG. 2 is a network diagram of an example OPS network which includes two interconnected sites.

FIG. 2 is a network diagram of an example OPS network 300 which includes two interconnected sites 302, 304. The two sites 302, 304 are interconnected by two fiber pairs, denoted as paths 16, 18. The paths 16, 18 can be diverse, even of differing lengths with intermediate equipment such as optical amplifiers 306. The sites 302, 304 each include an OPS 20 which is illustrated connected to each path 16, 18 and to a multiplexer/demultiplexer 308. In an embodiment, the sites 302, 304 can be data centers and the OPS network 300 can be a data center interconnect application. Data centers have proliferated, becoming the next-generation central office. The OPS network 300 provides an efficient optical transport approach with protection and minimal equipment/cost.

Figure 3:
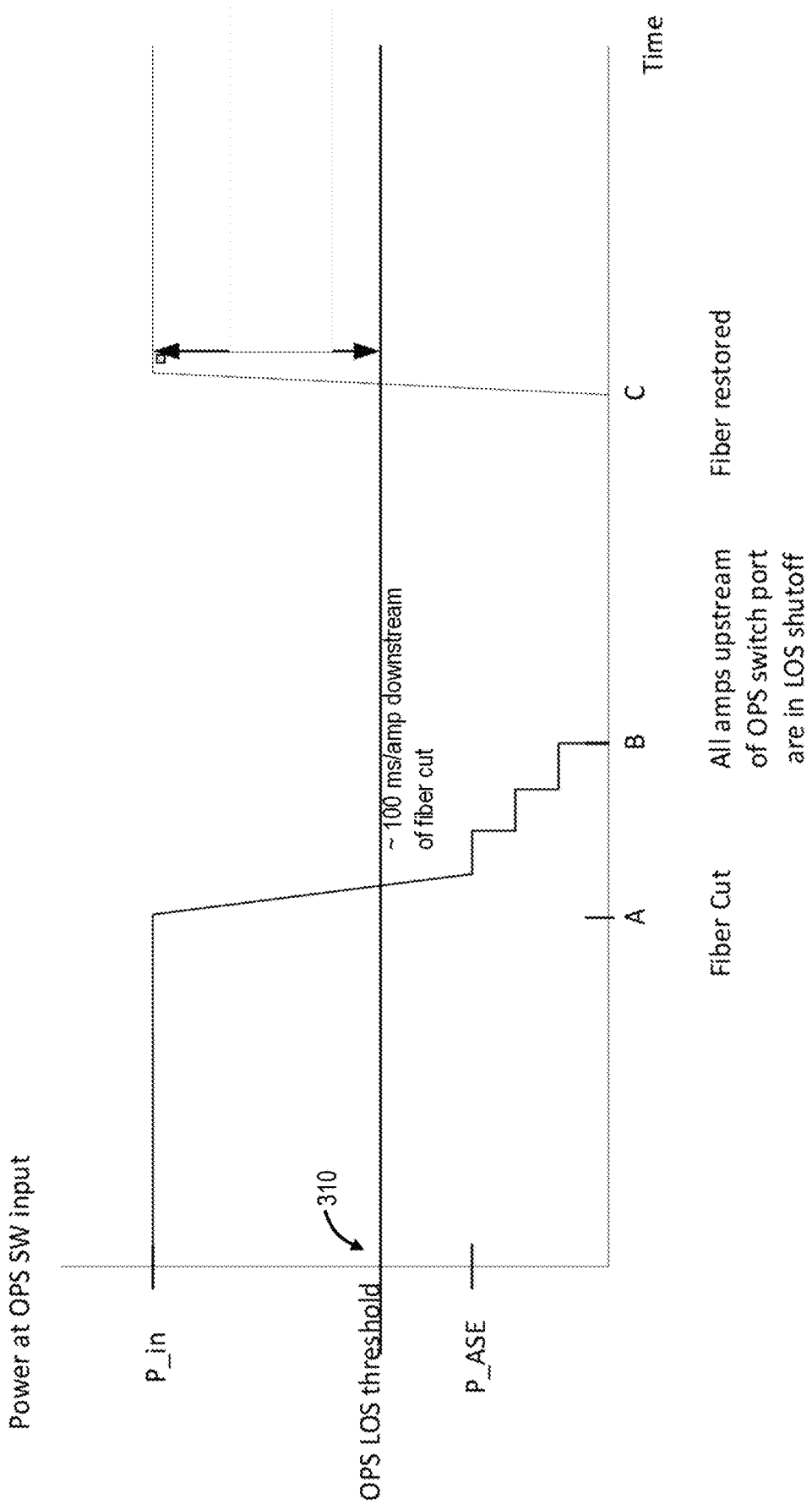
FIG. 3 is a graph of an example optical power at the OPS input over time in an example fiber cut scenario.

FIG. 3 is a graph of an example optical power at the OPS 20 input over time in an example fiber cut scenario. At the beginning of the graph (on the X-axis), the power at the OPS switch (SW) input is equal to P_in, well above an OPS Loss of Signal (LOS) threshold 310. At time A, there is a fiber cut, and the corresponding input power goes below the threshold 310 and stops at a power of the ASE (P_ASE) which steps down until all amplifiers upstream of the OPS switch port are in LOS shutoff at time B. At a time C, the fiber is restored, and the power increases back to P_in.

There are alternatives to using optical power to trigger the OPS 20. For example, a single transceiver/transponder can be configured to control the OPS 20, or this can be based on an ensemble of transceivers/transponders. Here, the OPS 20 switches based on loss of detection of the single transceiver/transponder or the ensemble of transceivers/transponders. Of course, this approach requires the specific presence of the single transceiver/transponder or the ensemble of transceivers/transponders, as well as a fast signaling path between the transceivers/transponders and the OPS. Also, as described in commonly-assigned U.S. Pat. No. 10,063,313, the OSC or the like can be used as a messaging channel to control the OPS 20.

Other approaches can include utilizing ASE-loading to simulate a higher channel count. Here, the ASE-loading is used to increase the received power at the end of the link such that a fiber cut results in a more pronounced and detectable change in received power. Another approach can include causing the amplifiers 306 to experience fast shutdown based on the fiber cut.

Example Multi-Span OPS Network

Figure 4:
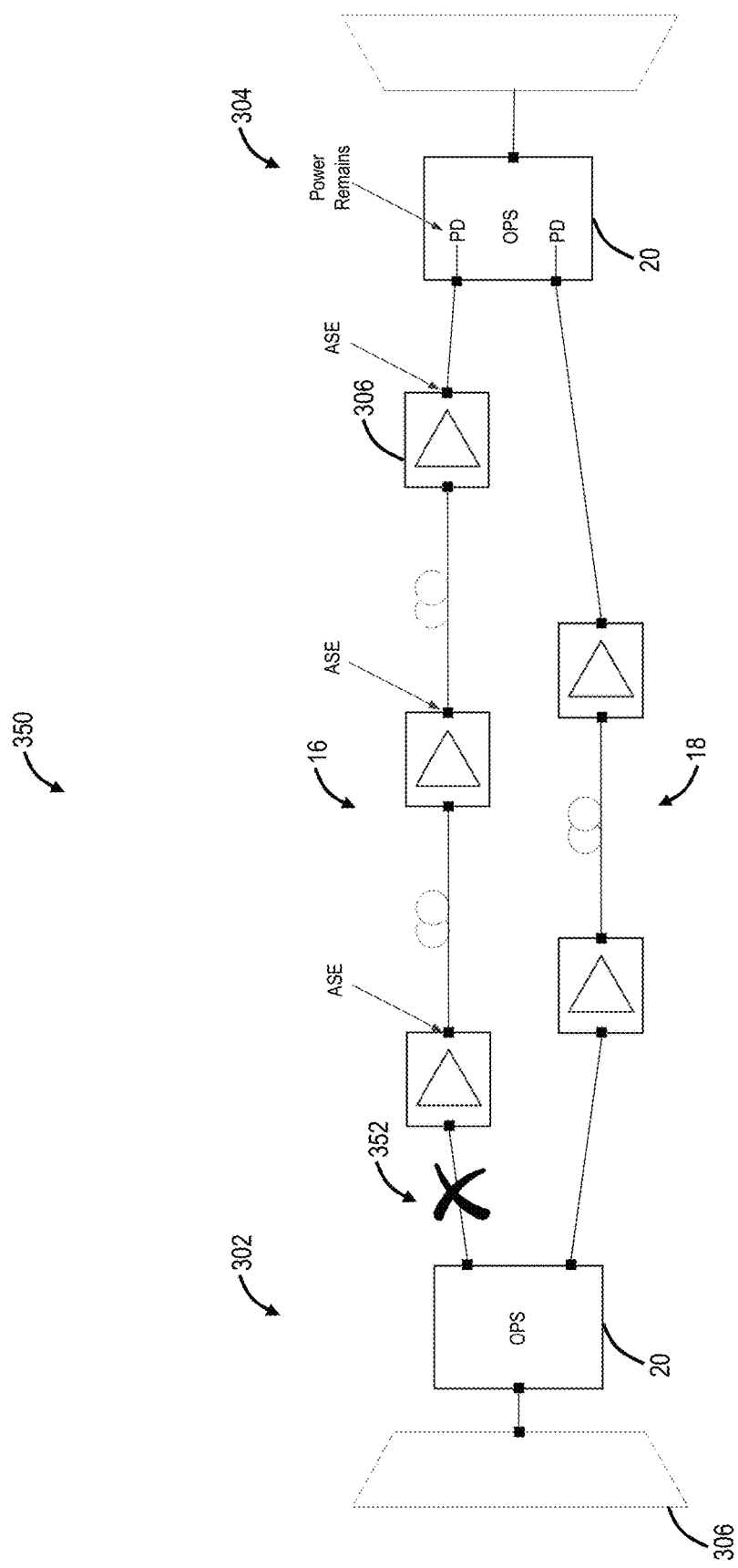
FIG. 4 is a network diagram of an example multi-span OPS network which includes two interconnected sites with various intermediate optical amplifiers.

FIG. 4 is a network diagram of an example multi-span OPS network 350 which includes two interconnected sites 302, 304 with various intermediate optical amplifiers 306. The two sites 302, 304 are interconnected by two fiber pairs, denoted as paths 16, 18. In this example, the paths 16, 18 are diverse with the path 16 having four spans (three intermediate optical amplifiers 306) and the path 18 having three spans (two intermediate optical amplifiers 306). The sites 302, 304 each include an OPS 20 which is illustrated connected to each path 16, 18 and to a multiplexer/demultiplexer 308.

Again, the conventional approaches almost universally monitor aggregate power to detect a fiber cut and trigger a switch from primary to the standby fiber path 16, 18. However, in a multi-span application, if a fiber cut 352 occurs close to the beginning of the fiber path as illustrated in FIG. 4, power will continue to exist on the failed path because the cascade of amplifiers will continue to generate ASE until a chain of shutdowns occurs. It may be possible to engineer a power threshold below which it can assume that the signal is missing and that the remaining power is ASE, but this needs to be evaluated on a per-system basis and can depend on the numbers of spans and their length. It may also require that a minimum number of channels be present which is yet another concession/complexity that exists with today's solution.

The conventional method for detecting a path failure is to monitor the power at the end of each path. The power originates from an ensemble of transmitters, each transmitting at a unique frequency within the supported channel plan. The power monitoring circuit must, therefore, have an optical filter bandwidth of the supported channel plan (typically 32-38.4 nm).

Figure 6:
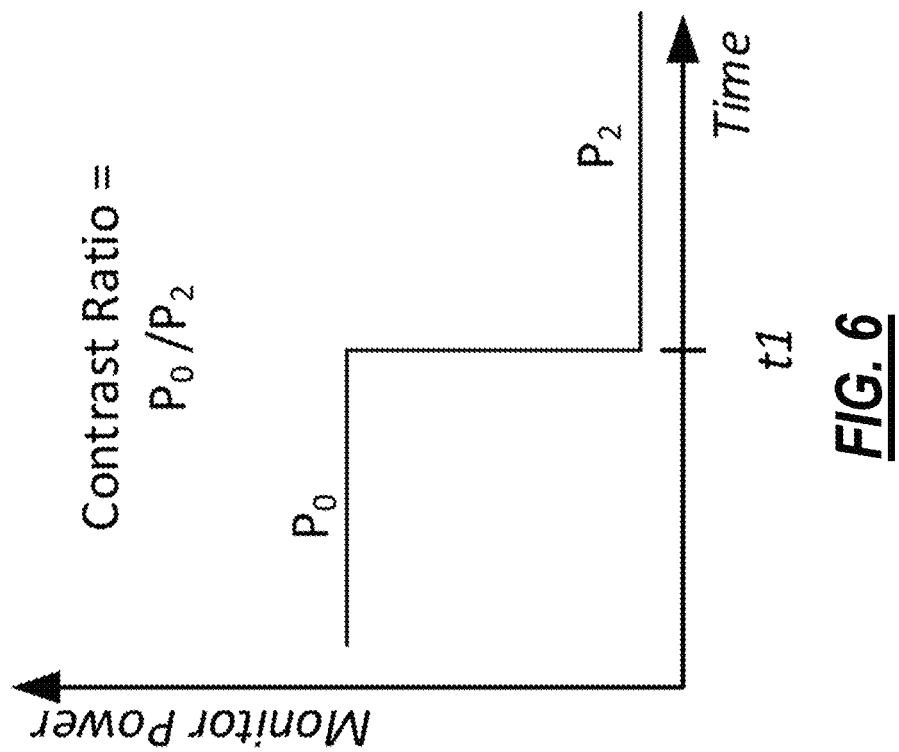
FIGS. 5 and 6 are graphs of example contrast ratios for evaluating optical power before/after a fiber cut.
Figure 5:
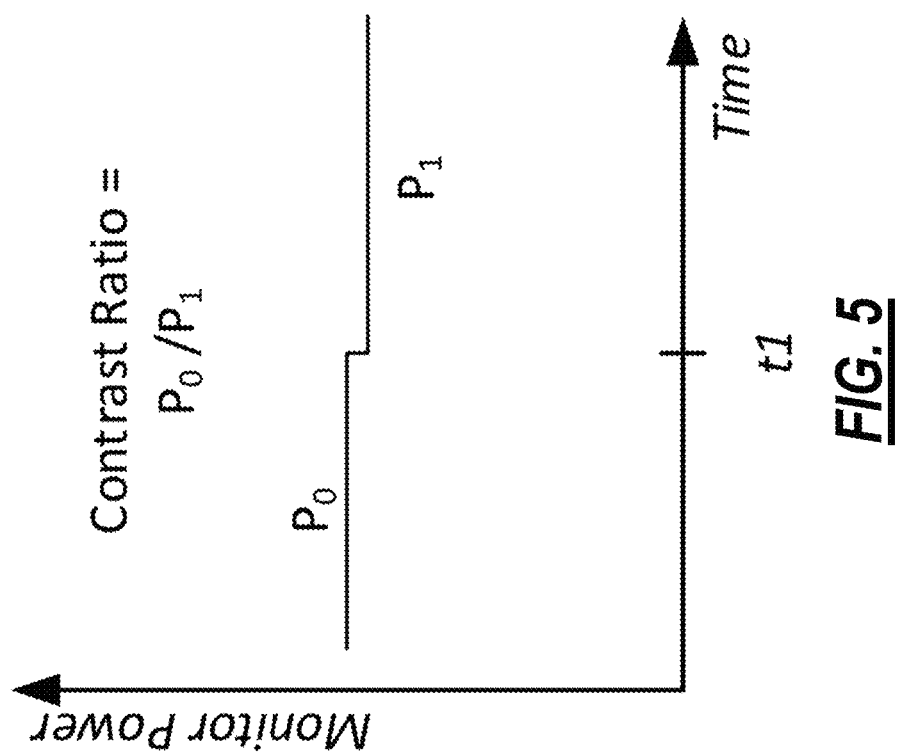

A Figure of Merit (FOM) used to describe the likelihood of detecting a fiber cut is the contrast ratio, which is the ratio of received power before a path failure to the received power after a path failure. The higher the ratio, the more reliably a path failure can be detected. FIGS. 5 and 6 are graphs of example contrast ratios for which a path failure occurs at time t=t1. FIG. 5 illustrates a detection scheme with a low contrast ratio (the change in monitored power is slight and may not be reliably detected). FIG. 6 illustrates a detection scheme with a high contrast ratio (the change in monitor power is clearly identifiable and can be reliably detected).

Figure 7:
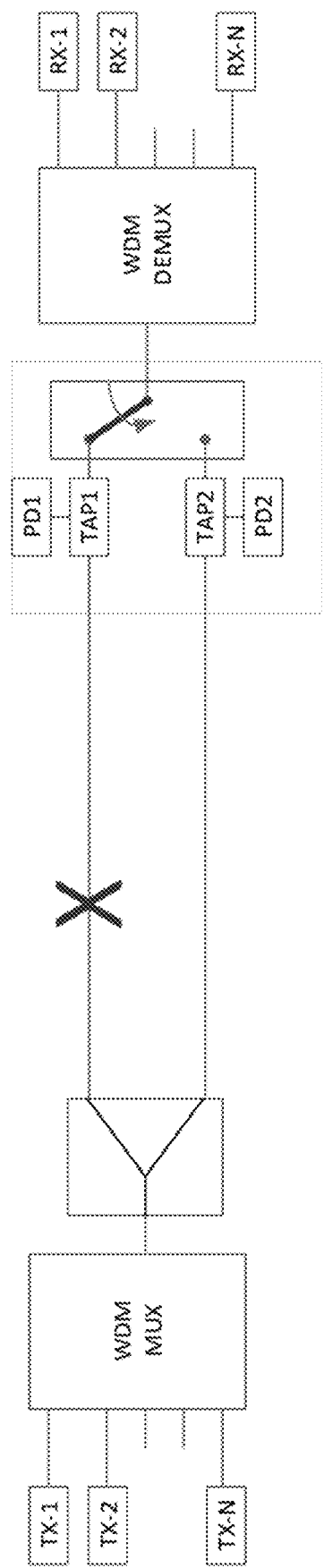
FIG. 7 is a network diagram of an OPS application for an unamplified Wavelength Division Multiplexing (WDM) link.

FIG. 7 is a network diagram of an OPS application for an unamplified WDM link. In an unamplified link, all the power detected at the link endpoint (PD1, PD2) originates from the source transmitter(s). A path failure results in a complete loss of signal power at the associated power monitor. The contrast ratio for this scenario is very high, limited by the noise of the monitoring circuit.

Figure 8:
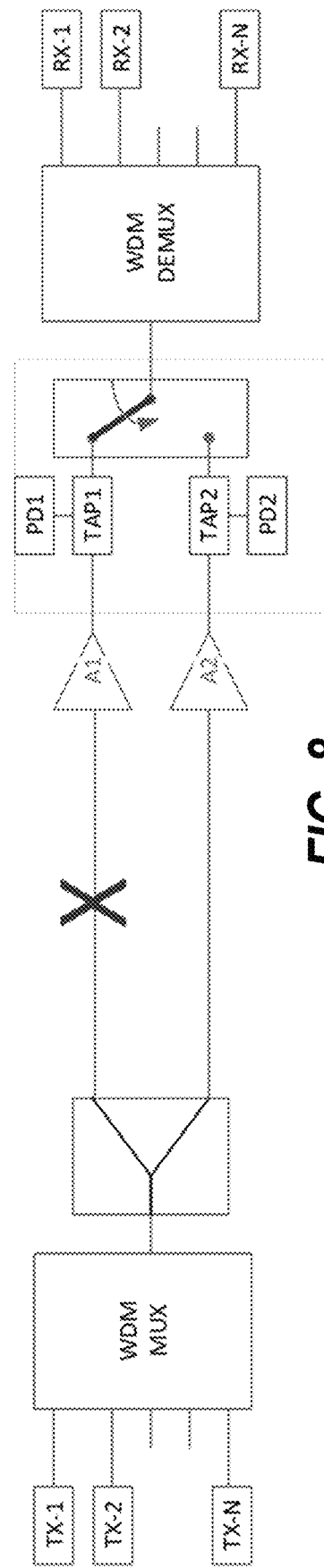
FIG. 8 is a network diagram of an OPS application for an amplified WDM link.

FIG. 8 is a network diagram of an OPS application for an amplified WDM link. In an amplified link, the power detected at the link endpoint originates from multiple sources (transmitters at the source, and amplifier noise generated by each amplifier on the path). A path failure results in a loss of power associated with sources upstream of the path failure point, but amplifiers downstream of the path failure point continue to generate power in the short term (within 50 ms of the path failure). The contrast ratio for this scenario is lower than for the unamplified case because of the residual power from surviving sources. The contrast ratio depends upon the relative strengths of the distributed sources and their location (upstream or downstream) relative to the path failure point.

In FIG. 8, there are two sources of optical power that are detected at the link monitoring points (PD1 and PD2): The ensemble of transmitters (Tx–1, Tx–2, ... Tx–N) and the amplifier A1 on the upper link monitored by PD1, and the ensemble of transmitters (Tx-1, Tx-2, . . . Tx-N) and the amplifier A2 on the lower link monitored by PD2. The power sourced at the transmitter site generally varies linearly with the number of transmitters (i.e., if there are 10 transmitters, there will be 10× more power than if there was a single transmitter). In the example offered, the transmitter power is attenuated through the fiber cable and amplified prior to the link power monitor.

Figure 9:
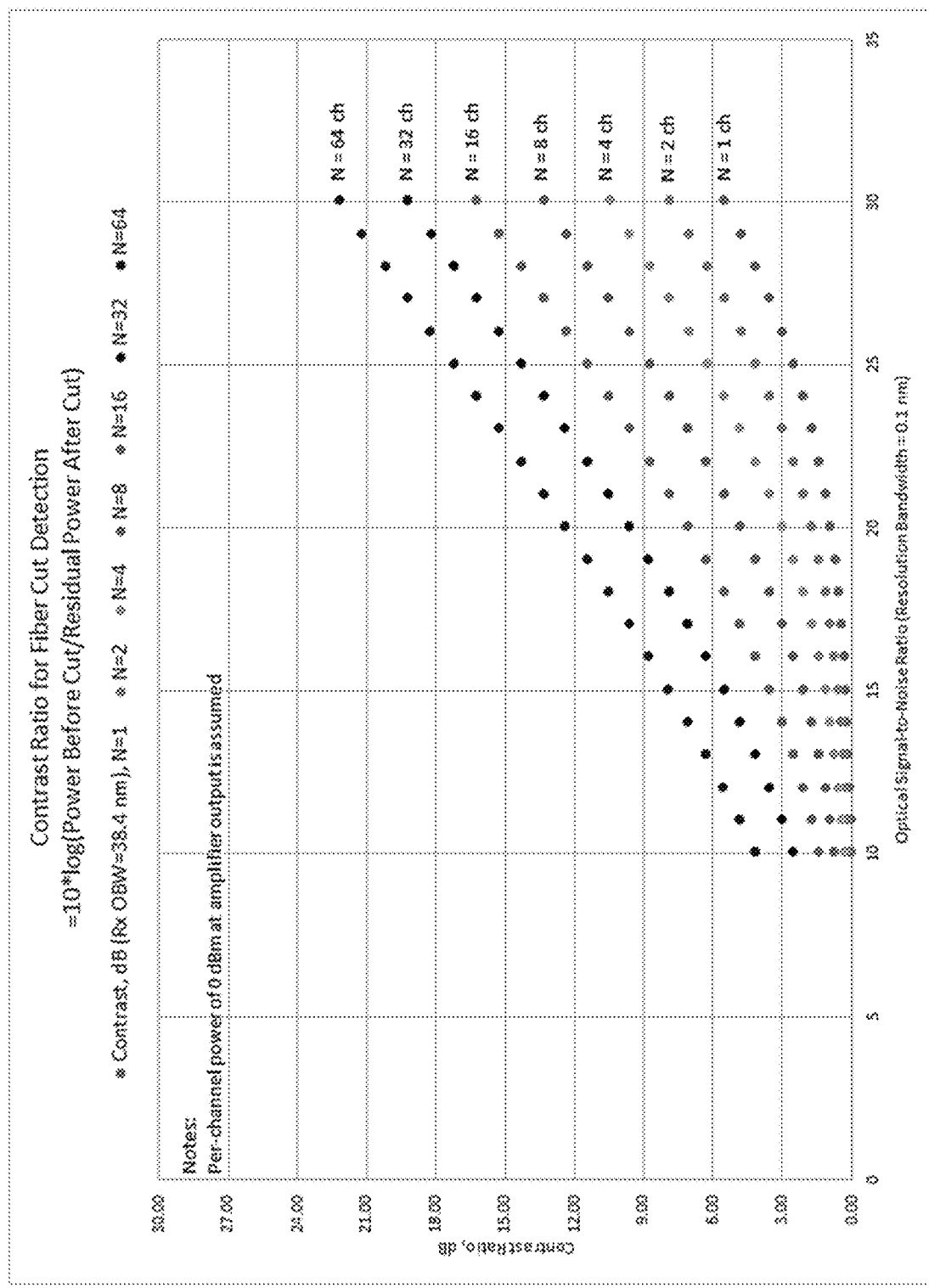
FIG. 9 is a graph of the path failure detection contrast ratio for various transmitter counts (N) and received Optical-Signal-to-Noise Ratio (OSNR)

The power sourced by the amplifiers (ASE power) depends upon their respective Gain, Noise Figure, and amplifier optical bandwidth. It can equivalently be expressed as a function of OSNR (referenced to 0.1 nm resolution bandwidth) and amplifier optical bandwidth. FIG. 9 is a graph of the path failure detection contrast ratio for various transmitter counts (N) and received OSNR. FIG. 9 includes a transmitter count (N=1, 2, 4, 8, 16, 32, 64) and Received OSNR for a photodetection circuit with 38.4 nm optical bandwidth and path failure point as indicated by the "X" in FIG. 8. The higher the contrast ratio, the more reliable is the path failure detection. A contrast ratio of 6 dB (a linear ratio of 4) is commonly considered the minimum for robust detection.

Observe that when OSNRs are low (the amplifier's noise power contribution is higher for low OSNRs, and lower for higher OSNRs), many transmitters are required for an acceptable contrast ratio. If the link has one or a few transmitters, the only way to achieve a contrast ratio>6 dB would be to engineer the link such that the OSNRs were high—30 dB—which may either be expensive or impractical.

Path Continuity Monitor

In an embodiment, the systems and methods include a dedicated wavelength between OPSs 20 for monitoring path continuity. The path continuity monitor's transmitter can be at a fixed wavelength, and the path continuity monitor receiver's optical bandwidth can be much narrower than the DWDM channel plan (e.g., 0.4 nm instead of 38.4 nm). This is a key point and essential advantage when applied to trunk protection of amplified links. With a narrowband optical filter preceding the path continuity monitor's receiver, amplifier noise contribution to the received power is proportionally lower (e.g., with 0.4 nm received optical bandwidth −0.4/38.4=~1 percent of the noise power received in the conventional approach (which has 38.4 received optical bandwidth). This means that the path continuity monitor measures a much lower power following a fiber cut, equivalent to an improved contrast ratio.

Figure 10:
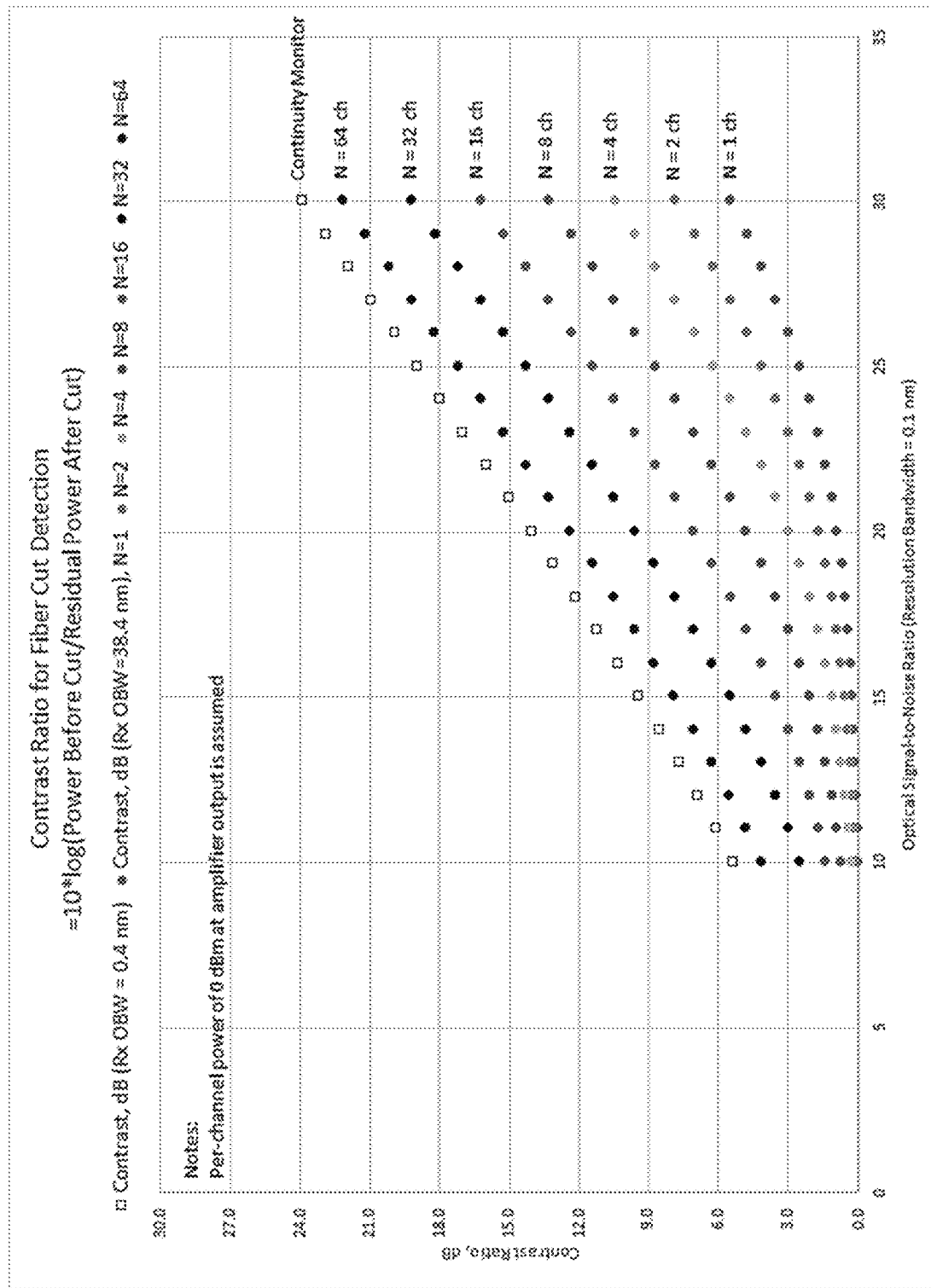
FIG. 10 is a graph of the path failure detection contrast ratio for various transmitter counts (N) and received OSNR with the contrast ratio of the path continuity monitor included.

FIG. 10 is a graph of the path failure detection contrast ratio for various transmitter counts (N) and received OSNR with the contrast ratio of the path continuity monitor included. The contrast ratio of the path continuity monitor is overlaid over the data, previously shown in FIG. 9. With a significant reduction (~20 dB) in measured amplifier noise, the path continuity monitor has a better contrast ratio than the conventional approach, and exceedingly so when applied to links carrying small numbers of channels (1 to 4).

Figure 11:
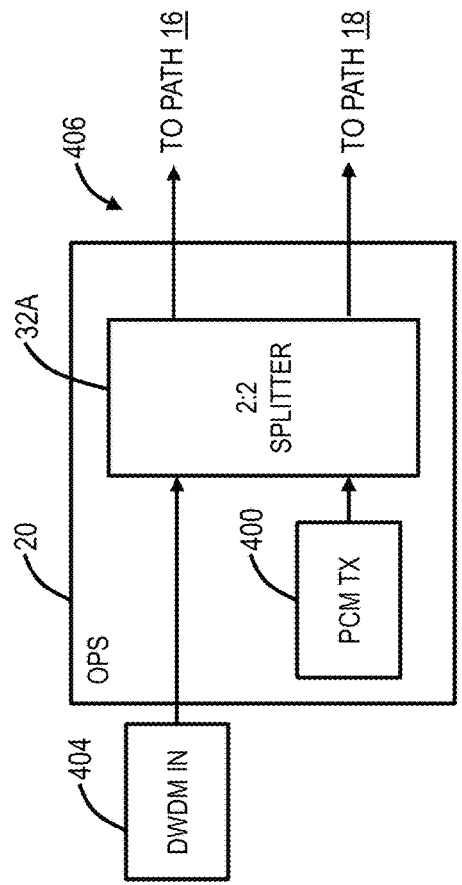
FIG. 11 is a block diagram of a path continuity monitor transmitter included in an OPS on the transmitter side.
Figure 12:
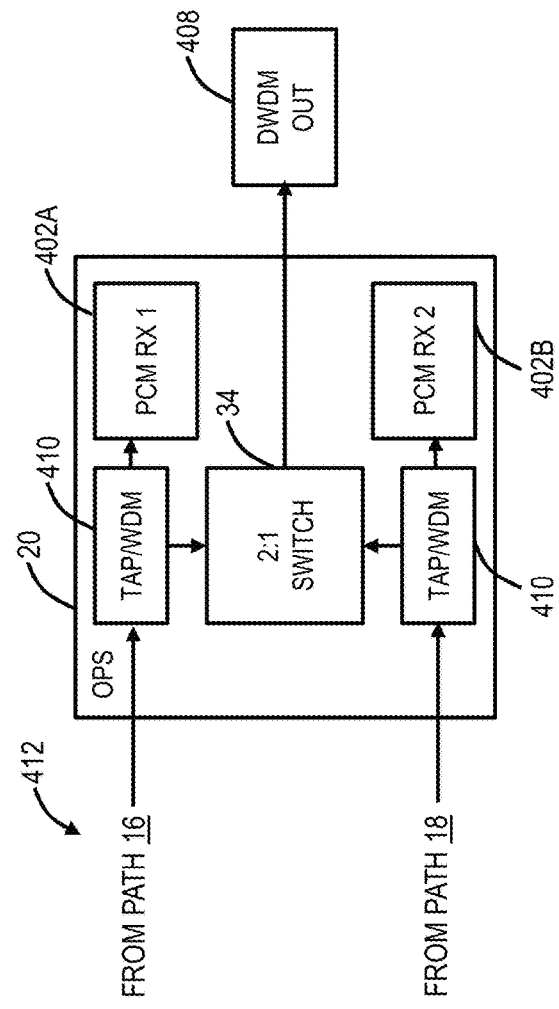
FIG. 12 is a block diagram of path continuity monitor receivers included in the OPS on the receiver side.
Figure 13:
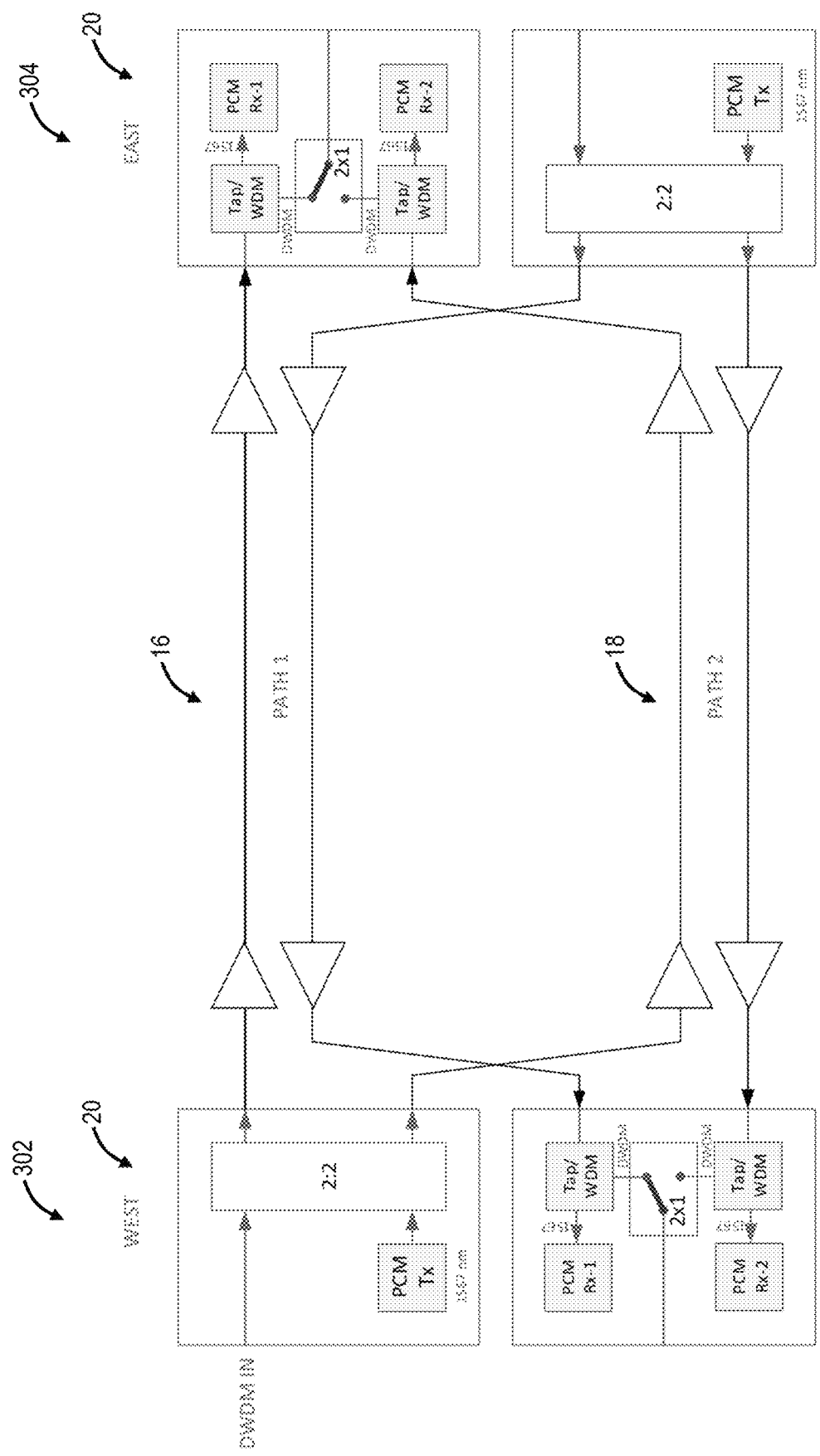
FIG. 13 is a network diagram of the path continuity monitor incorporated into the OPS and used in an amplified link.

FIG. 11 is a block diagram of a Path Continuity Monitor (PCM) transmitter 400 included in an OPS 20 on the transmitter side. FIG. 12 is a block diagram of Path Continuity Monitor (PCM) receivers 402A, 402B included in the OPS 20 on the receiver side. FIG. 13 is a network diagram of the path continuity monitor incorporated into the OPS 20 and used in an amplified link. The path continuity monitor includes the PCM transmitter 400 (laser) whose output is multiplexed with an ensemble of WDM transmitters, broadcast to both paths 16, 18, and a per-path receiver 402A, 402B (photoreceiver).

In FIG. 11, the OPS 20 includes a 2:2 splitter 32A which receives two inputs, namely a DWDM input 404 and the PCM transmitter 400, combines the two inputs and outputs the combined two inputs on two outputs 406 which connect to the paths 16, 18. Note, the conventional OPS includes a 1:2 splitter 32 where there is only one input (the DWDM input) which is split to the outputs to the paths 16, 18. The PCM transmitter 400 is a separate input to the 2:2 splitter 32A (which can be a 2:2 directional coupler). In another embodiment, the OPS 20 can still use the 1:2 splitter 32 and the PCM transmitter 400 can be added via a coupler with the DWDM input 404, prior to the input to the 1:2 splitter 32. In another embodiment, the PCM transmitter can be added via an optical filter which would multiplex the PCM signal onto the same fiber as the DWDM input.

The PCM transmitter 400 wavelength can be chosen at a fixed wavelength that lies within the gain bandwidth of the amplifier 306 but outside of the DWDM channel plan (i.e., on the shoulder of the gain curve). By choosing the path continuity monitor's transmitter 400 wavelength to be within the amplifier passband (e.g., in the C-band such as between about 1525 nm and 1570 nm), the path continuity monitor signal passes through the amplifiers (unlike an OSC) and can be used even if the link has several amplifiers. In an embodiment, the PCM transmitter 400 wavelength can be selected outside of data-bearing channel wavelengths, such as 1528 nm, 1565 nm, 1567 nm, etc., to avoid conflicts with the data-bearing channel wavelengths. Accordingly, the operation of the PCM transmitter 400 imposes no restrictions to DWDM channel usage.

In FIG. 12, the OPS 20 includes the 2:1 switch 34 receives signals from each of the paths 16, 18 and provides a single DWDM output 408 based on which port the 2:1 switch 34 is configured to. For the path continuity monitor, the OPS 20 in FIG. 12 includes a tap/WDM component 410 prior to the 2:1 switch 34 and configured to receive corresponding inputs 412 from the paths 16, 18. The tap/WDM component 410 can be either a small power tap or a WDM coupler to split out the path continuity monitor wavelength.

The PCM receivers 402A, 402B connect to their corresponding tap/WDM component 410, to either receive only the spectrum at the path continuity monitor wavelength (when the tap/WDM component 410 is a WDM coupler) or to receive the entire spectrum at low power (when the tap/WDM component 410 is a power tap). In either case, the PCM receivers 402A, 402B can include an optical filter which excludes all-optical spectrum except around the path continuity monitor wavelength and a photodetector for detecting the path continuity monitor wavelength. As described herein, the PCM receivers 402A, 402B can have small optical bandwidth (e.g., around 0.4 nm) for an improved contrast ratio.

At the termination of each of the paths, the path continuity monitor signal is narrow-band filtered from the composite (either directly or via a broadband tap), and its power is measured by a photoreceiver (the PCM receivers 402A, 402B). A path failure is detected by a loss of path monitoring signal at the path termination point. If the currently selected (active) path fails, the switch selects an alternate path that is not presently failed.

With the PCM transmitter 400 and the PCM receivers 402A, 402B, the OPS 20 can detect path continuity or failure on its own, independent of DWDM channel, OSC presence, or the messaging framework. Path failures on links carrying low wavelength counts at low OSNRs can be reliably detected (by virtue of the path continuity monitor's high contrast ratio). Specifically, the OPS 20 has the path continuity monitor wavelength on both paths 16, 18 based on the configuration in FIG. 11. The OPS 20 can detect the presence of the path continuity monitor wavelength on one or both of the paths 16, 18 based on the PCM receivers 402A, 402B.

In an embodiment, the path continuity monitor can additionally be used as a communication channel for one OPS 20 to signal to its remote mate the desired switch state so that each unidirectional signal travels over the same path. Here, there is data communication via modulation at the PCM transmitter 400 and corresponding data demodulation at the PCM receivers 402A, 402B. Thus, the path continuity monitor can serve dual purposes~1) its presence is used to detect LOL/LOS on either of the paths 16, 18, and 2) and the data communication over the path continuity monitor is used to synchronize the switch states.

In an embodiment, the PCM transmitter 400 and the PCM receivers 402A, 402B are integrated with the OPS 20 components (the 2:2 splitter 32A, the 2:1 switch 34). Here, data from the PCM receivers 402A, 402B can be tied directly into the 2:1 switch 34 for control thereof, enabling quick switching as well as coordination of the paths 16, 18. In another embodiment, the PCM transmitter 400 and the PCM receivers 402A, 402B can be external from the OPS 20. Note, variously the two receivers are shown, namely the PCM receivers 402A, 402B. In another embodiment, there can be a single PCM receiver 402A which can be to both paths 16, 18 via a 2:1 switch (not shown). The 2:1 switch can toggle between the two paths. Alternatively, the 2:1 switch can toggle between the two paths to determine which path 16, 18 has the path continuity monitor wavelength. In yet another embodiment, the single PCM receiver 402A can be connected to both paths 16, 18 simultaneously with each path having a different path continuity monitor wavelength or unique identifier.

Figure 14:
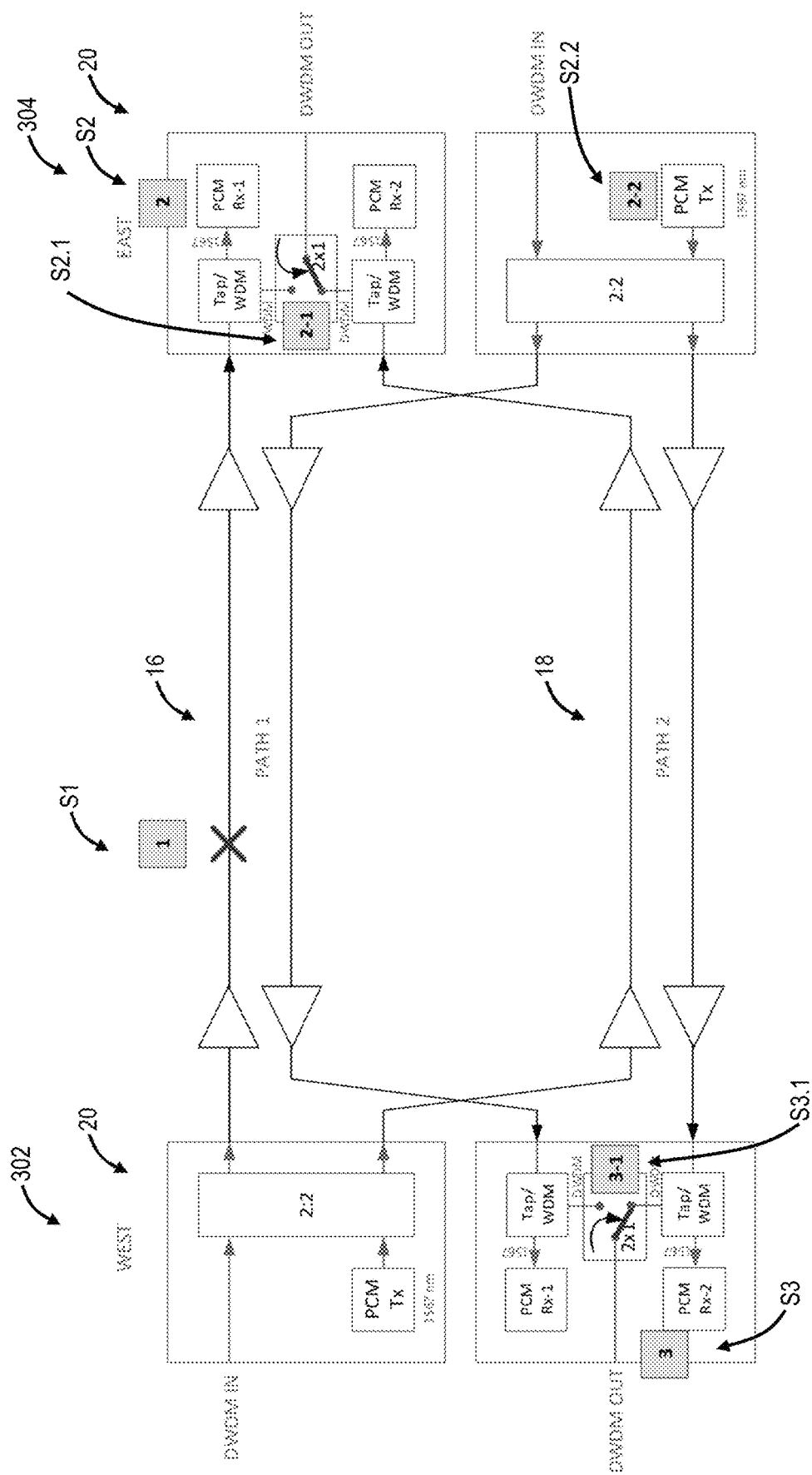
FIG. 14 is a network diagram of the path continuity monitor incorporated into the OPS and used in an amplified link, illustrating an example unidirectional path failure.

FIG. 14 is a network diagram of the path continuity monitor incorporated into the OPS 20 and used in an amplified link, illustrating an example unidirectional path failure. If there is a unidirectional path failure, the OPS 20 downstream of that path failure will switch. That same OPS's 20 PCM transmitter 400 can signal (using an appropriate modulation scheme) the remote OPS 20 that it has switched to a particular path. Upon receiving that message, the remote OPS 20 can switch to the matching path. In this manner, the two switches are synchronized for their path selection.

In FIG. 14, at a point S1, there is a fiber cut. At a point S2, a Loss of Signal (LOS) is detected at the East OPS 20 PCM receiver 402A which causes the East OPS 20 to switch to the path 18 from the path 16 (point S2.1) and to signal via the PCM transmitter 400 to the West OPS 20 to also switch to the path 18 (point 2.2). The West OPS 20 receives the signal from the PCM transmitter 400 of the East OPS 20 and causes a switch to the path 18 (point 3.1).

If there is a bidirectional failure, each of the OPS's will independently switch away from the failed path. The path continuity monitor transmitters 400 can signal each other that they have switched; however, neither of those signals will be received because of the bidirectional path failure. In this scenario, the switches are inherently synchronized for path selection because each individually detected the failure. As described herein, the path continuity monitor has no dependency upon the presence of DWDM channels or OSC.

Nested OPS

As described herein, the OPS 20 provide 1+1 protection, i.e., one protection path and one working path, i.e., the paths 16, 18. The path continuity monitor can be utilized to extend the OPS 20 application to a 1:N protection scheme via a so-called nested (or cascaded) OPS configuration. In 1:N protection, there is one protection path for N working paths, N≥2. By nested (or cascaded), the OPSs 20 are bookended with another pair of OPSs 20. The path continuity monitor described herein can be used to isolate faults to a specific path since the path continuity monitor wavelength is monitored at each OPS 20.

Figure 15:
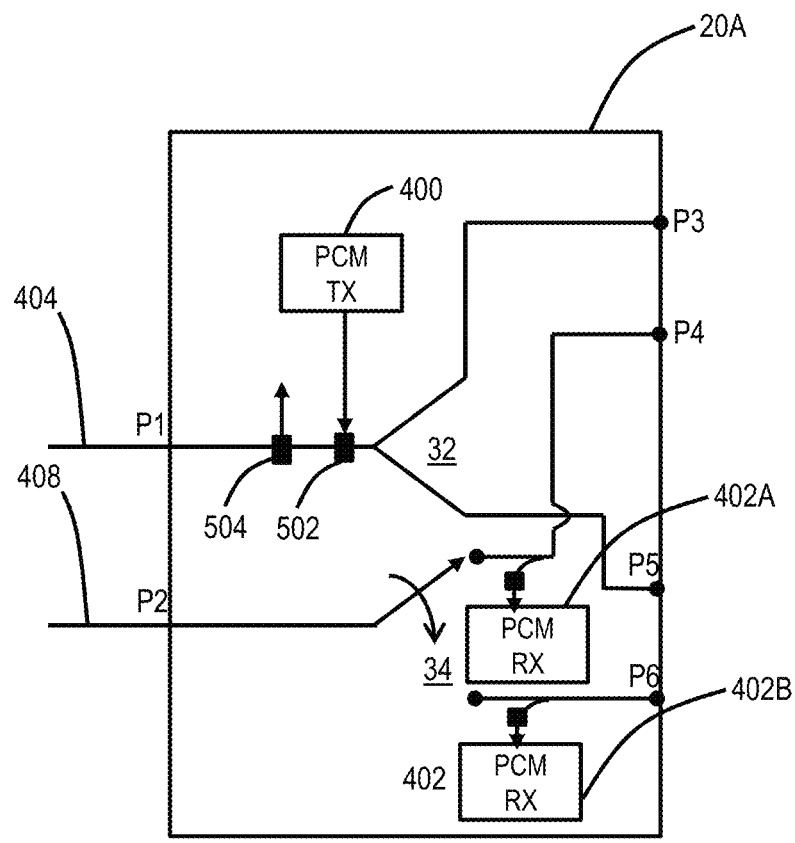
FIG. 15 is a block diagram of an OPS including the path continuity monitor and a configuration for supporting a nested OPS deployment.

FIG. 15 is a block diagram of an OPS 20A including the path continuity monitor and a configuration for supporting a nested OPS deployment. Here, the OPS 20A includes, on the transmitter side, the 1:2 splitter 32 which receives the DWDM input 404 and adds the PCM transmitter 400 via a coupler 502. Alternatively, the OPS 20A can include the 2:2 splitter 32A in lieu of the coupler 502. For the nested configuration, the OPS 20A includes a filter 504 on the DWDM input 404 to block any previously added PCM transmitter 400 wavelengths. The filter 504 can block a specific portion of the spectrum while allowing the remaining spectrum. For example, the filter 504 can block 1567 nm and surrounding spectrum when the PCM transmitter 400 wavelength is at 1567 nm.

For illustration and description, the OPS 20A has six ports, labeled P1-P6. Ports P1, P2 support the input 404 and the output 408, respectively. Ports P3, P4 support a first path (e.g., the path 16) with port P3 being an output port (transmitter) and port P4 being an input port (receiver). Ports P5, P6 support a second path (e.g., the path 18) with port P5 being an output port (transmitter) and port P6 being an input port (receiver). Ports P3, P5 receive an output from the 1:2 splitter 32 (or the 2:2 splitter 32A). Ports P4, P6 are connected to the 2:1 switch 34 and an output of the 2:1 switch 34 is one of the ports P4, P6 based on the switch setting.

Figure 16:
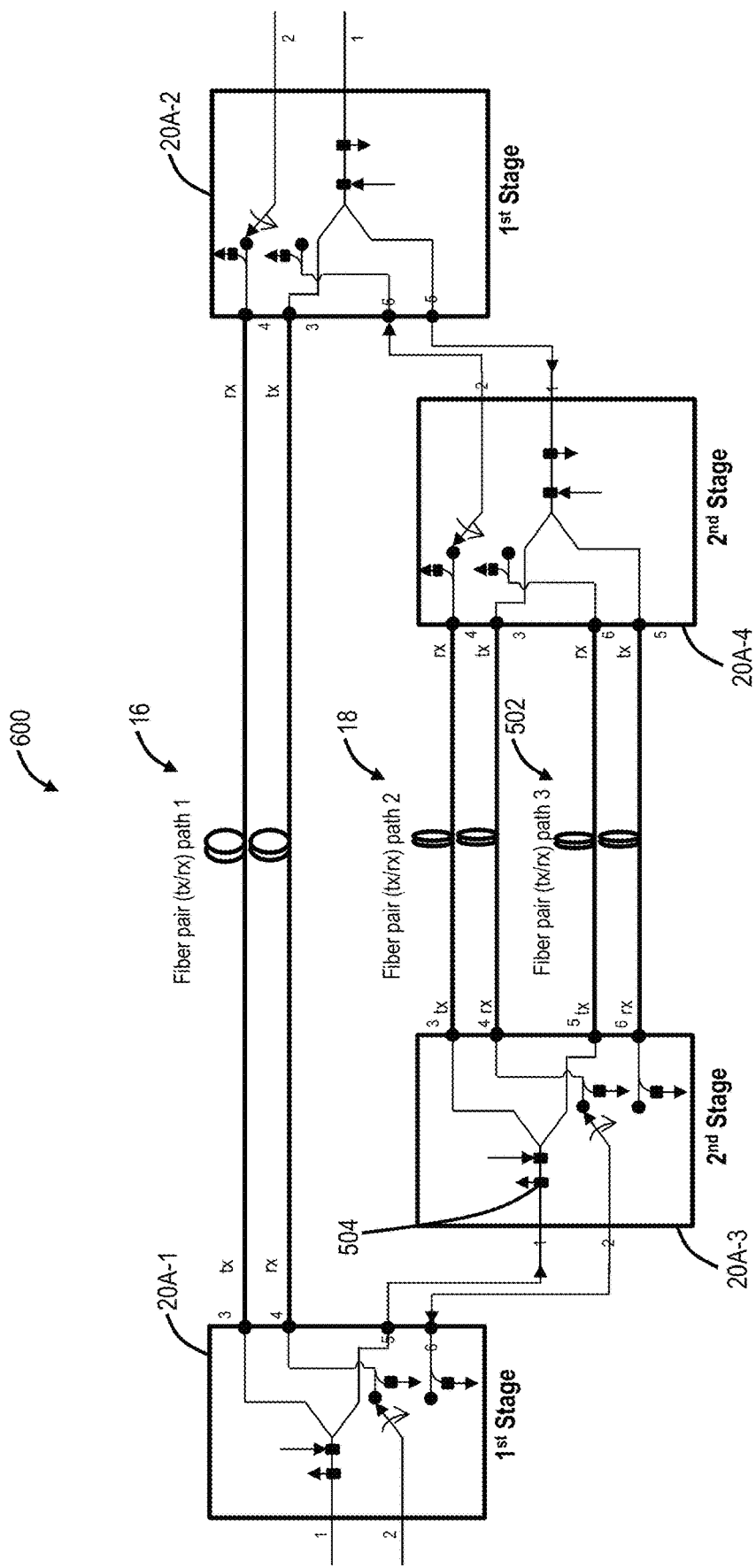
FIG. 16 is a network diagram of a nested OPS network with two sets of OPSs supporting 1:2 protection.

FIG. 16 is a network diagram of a nested OPS network 600 with two sets of OPSs 20A-1, 20A-2, 20A-3, 20A-4 supporting 1:3 protection. Here, there are three paths 16, 18, 502. In this example, there is an outer set of OPSs 20A-1, 20A-2 and an inner set of OPSs 20A-3, 20A-4. The outer set of OPSs 20A-1, 20A-2 support the paths 16 or the paths 18, 508, and the inner set of OPSs 20A-3, 20A-4 support the paths 18, 508. If a single pair (also defined as a stage) of OPS can provide protection for 2× fiber paths, in order to protect Nx fiber paths, N−1 protection stages or OPS pairs are required. An output of the OPS 20A-1 is an input to the OPS 20A-3 and the filter 504 in the OPS 20A-3 is configured to prevent the PCM transmitter 400 wavelength from the OPS 20A-1 onto the paths 18, 508. In this manner, the PCM transmitter 400 wavelength is isolated to support per nested OPS configuration LOS detection.

In order to guarantee fast and bi-directional protection switching for 1:N fiber protection where N>2, i.e., for the nested OPS configuration, the following is proposed in addition to the path continuity monitor described earlier. The communication signal coming from outer protection stage is blocked, via the filter 504, so that each nested protection stage can use their own communication signal to communicate to the far end to do a switch at the event of a fiber break.

The signal from the outer stage can be blocked either by using the optical filter 504 that will filter out the specific signal bandwidth before inserting the new transmit signal for the given protection stage or by using a switch or attenuation on the outer block to stop the transmission of the signal to downstream nested protection layers. On the receive direction, the communication signal from inner protection stage is propagated to outer protection stage so that at the event of all fiber cuts protected by the inner protection switches, the outer stage can switch to the other available fiber path.

Figure 17:
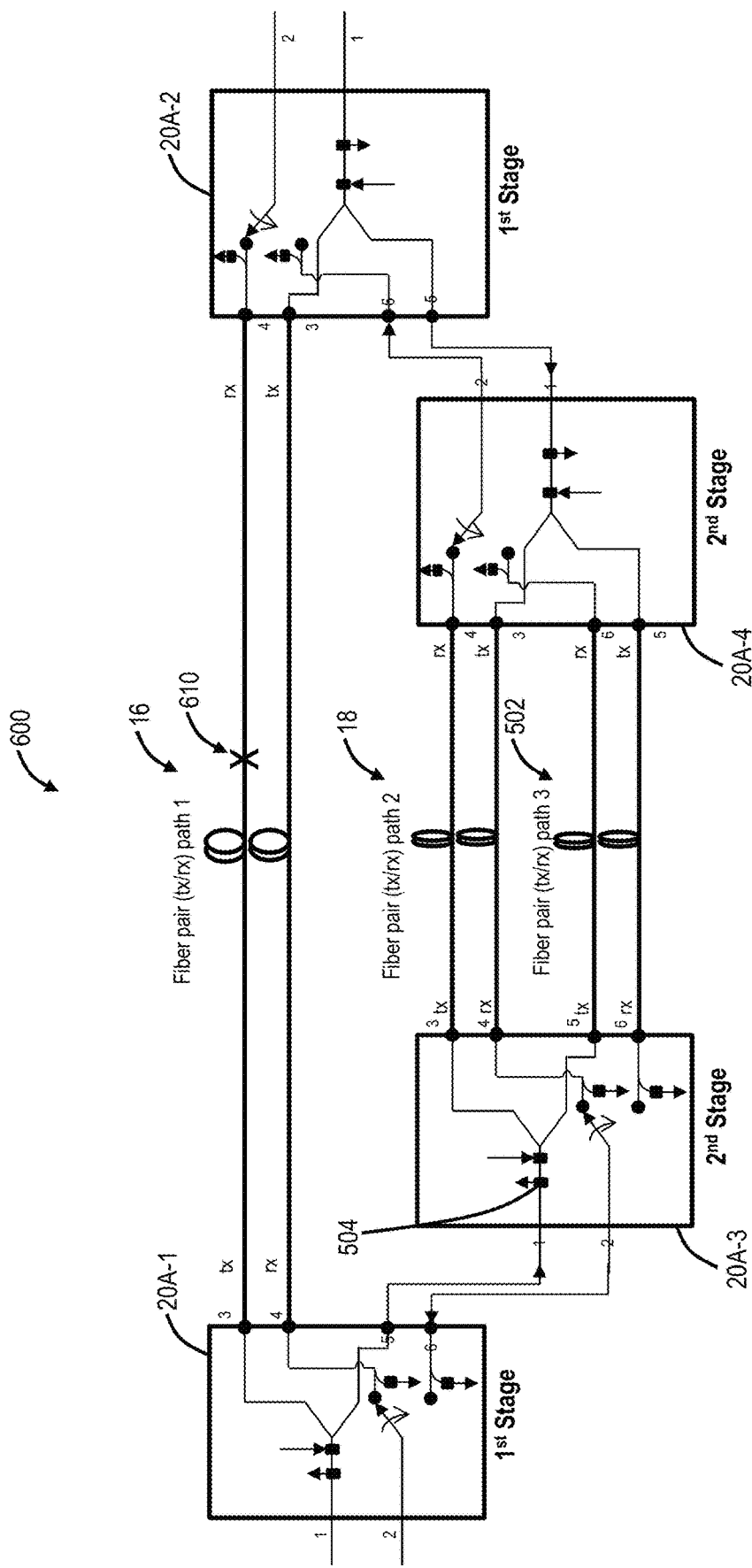
FIG. 17 is a network diagram of the nested OPS network illustrating a unidirectional fiber cut on the first path.

FIG. 17 is a network diagram of the nested OPS network 600 illustrating a unidirectional fiber cut on the first path 16. Initially, traffic is operating on the first path 16, i.e., all switches 34 at the receiver in the first stage (outer stage) are set to the port P4 and the same on the second stage (inner stage) where the switches 34 are set to the port P4. A fiber cut 610 is assumed on the path 16 in the direction from the OPS 20A-1 to OPS 20A-2. The OPS 20A-2 detects a loss of communication signal or pilot tone coming from the other end (the OPS 20A-1). The OPS 20A-2 switches to the other switch port (P6).

The OPS 20A-2 transmits a unique modulated signal related to switch port P3 that still uses fiber path 1 16 in the direction of the OPS 20A-2 to the OPS 20A-1 to shut down the EDFAs in the link. The OPS 20A-1 receives the unique modulated signal and switches to other port (port P6). The OPS 20A-4 blocks the signal coming from the OPS 20A-2 in order to avoid collision with its own communication mechanism since they all use the same in-band frequency. The OPS 20A-3, 20A-4 remain switched at their switch 1 for fiber path 2 18.

Figure 18:
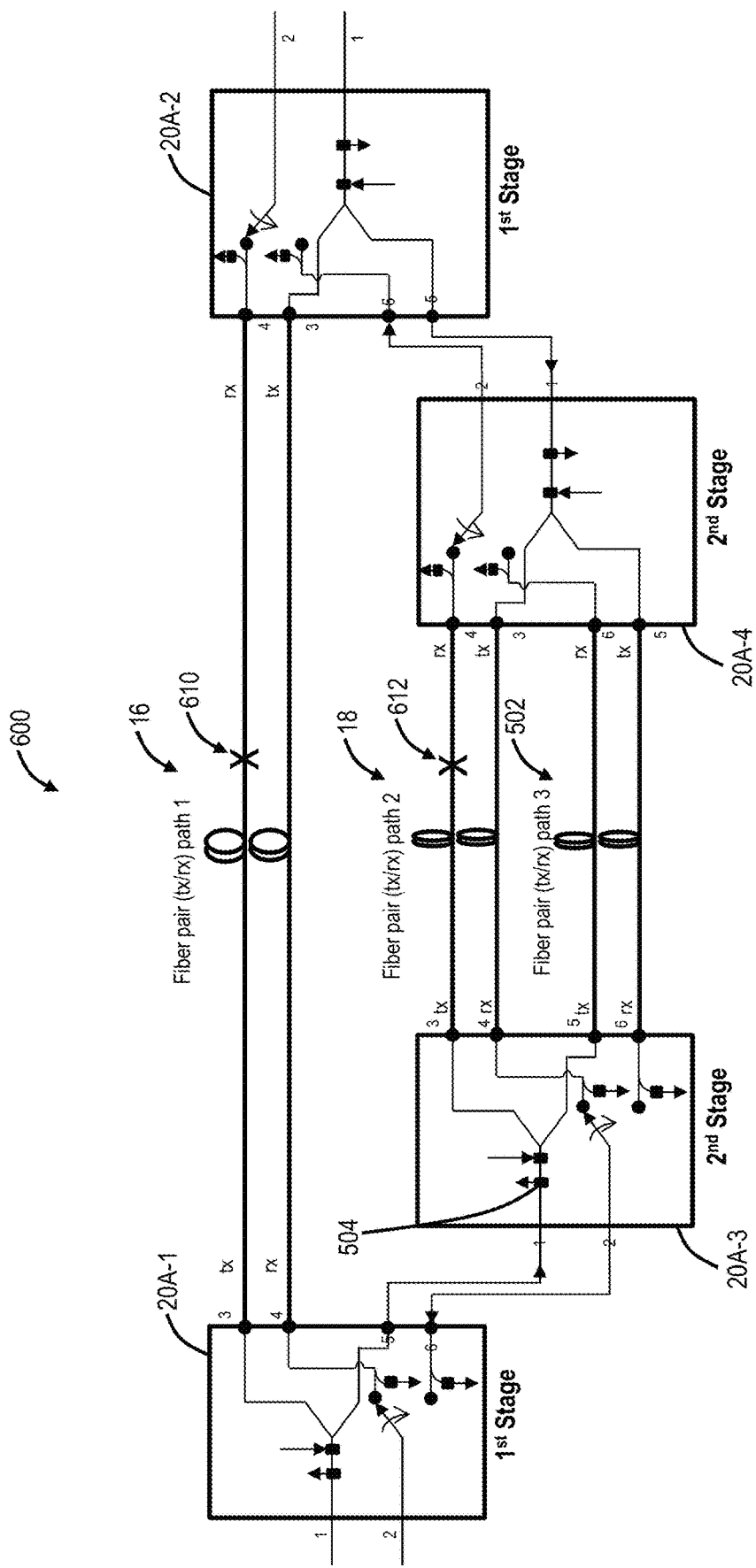
FIG. 18 is a network diagram of the nested OPS network continuing from FIG. 17 illustrating another unidirectional fiber cut on the second path.

FIG. 18 is a network diagram of the nested OPS network 600 continuing from FIG. 17 illustrating another unidirectional fiber cut on the second path 18. Initially, in FIG. 18, the fiber path 16 is cut, and the traffic is operating over the path 18. Now, fiber path 18 gets a $2^{nd}$ fiber cut 612 in the direction of the OPS 20A-3 to the OPS 20A-4. The OPS 20A-4 detects the loss of communication signal coming from the OPS 20A-3, switches to port P6, and sends the unique modulated signal designated for port P6. The OPS 20A-3 detects the modulated signal for port P6, switches to it right away and sends a signal back. The signal from the OPS 20A-4 is propagated to the OPS 20A-1 via the OPS 20A-3. The OPS 20A-1 receives a signal to stay on port P6 and sends the signal back, but it gets blocked by the OPS 20A-3. Similarly, a signal from the OPS 20A-3 is traversed to the OPS 20A-2 to stay on switch port P6.

Figure 19:
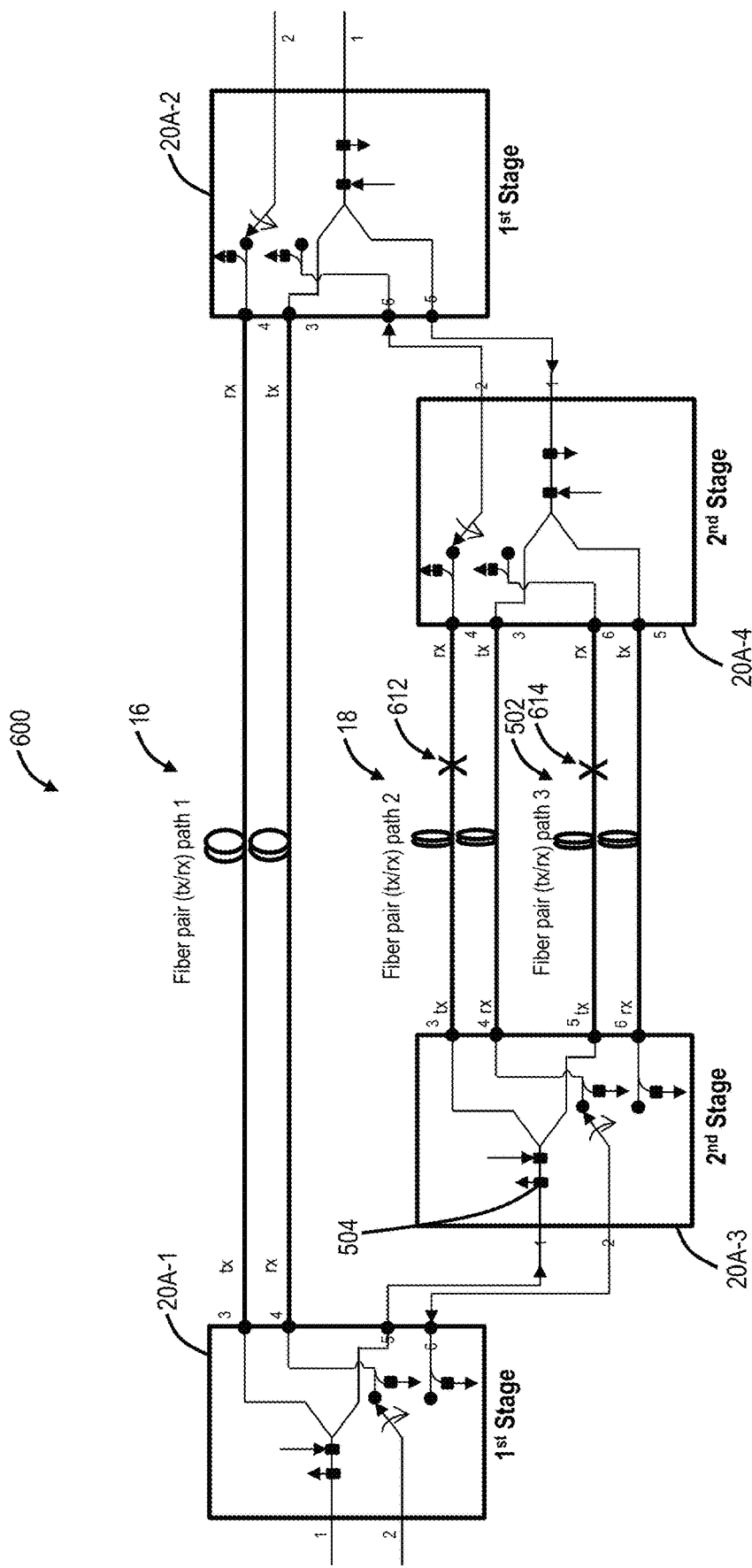
FIG. 19 is a network diagram of the nested OPS network illustrating unidirectional fiber cuts on the inner stage (second stage) OPSs.

FIG. 19 is a network diagram of the nested OPS network 600 illustrating unidirectional fiber cuts on the inner stage (second stage) OPSs 20A-3, 20A-4. FIG. 19 can also be viewed as a continuation of FIG. 18 after the fiber cut 610 is repaired. The fiber path 18 is cut 612 and traffic is switched to the path 502; the fiber path 16 is now repaired. Now, fiber path 502 gets a $3^{rd}$ fiber cut 614 in the direction of the OPS 20A-3 to the OPS 20A-4. The OPS 20A-4 detects the loss of the communication signal coming from the OPS 20A-3. Since it does not see a signal coming from the OPS 20A-3 on the other switch port, it stays on its current switch port P6. The OPS 20A-3 detects no new information on the PCM link and stays on port P6. The OPS 20A-2 currently switched to port P6 detects a loss of PCM signal coming from the inner stage ($2^{nd}$ stage). The OPS 20A-2 sees a signal showing up from the OPS 20A-1 to the other switch port and right away switches to it. The OPS 20A-2 sends a message back to the OPS 20A-1 that triggers the OPS 20A-1 to switch to port P4 to remain synchronized with the OPS 20A-2.

Figure 20:
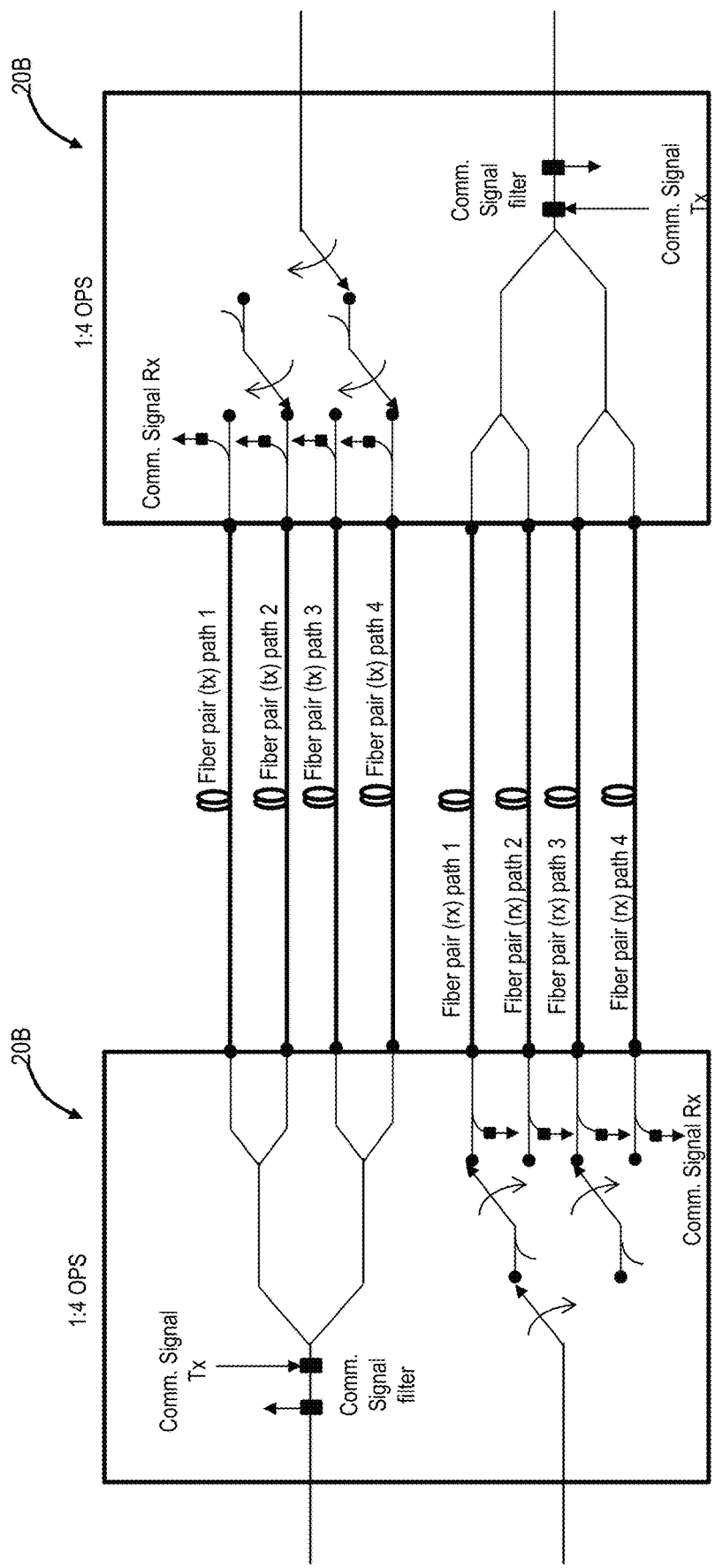
FIG. 20 is a block diagram of a 1:4 OPS.

FIG. 20 is a block diagram of a 1:4 OPS 20B. Of note, the OPS 20A in the nested configuration is shown as a separate block in the previous FIGS. Of course, in a physical embodiment, the OPS 20A can be combined into a single circuit pack, module, chassis, etc. so that a single communication signal source (PCM transmitter 400) or pilot tone can be used for all combined stages. The OPS 20B can generate Nx unique modulated signals over the communication channel for 1:N protection fiber paths so that a unique signal can be sent by the OPS 20B to the far end for a given protection path. For example, a 1:4 OPS circuit pack can contain optical switches for protection for up to 4× protection paths, where the in-band communication signal can be modulated 4× different unique frequencies so that a far end OPS can decode that and switch to a respective switch port.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Optical Protection Switch (OPS) comprising:
   a splitter connected to a transmitted input and a path continuity monitor transmitter and configured to receive a path continuity monitor signal from the path continuity monitor transmitter and the transmitted input and to output the transmitted input with the path continuity monitor signal to two paths;

a switch connected to a receiver output and configured to provide one of two receiver inputs each from one of the two paths based on a setting of the switch; and two path continuity monitor receivers each connected to a corresponding receiver input of the two receiver inputs and configured to detect a corresponding path continuity monitor signal split from a complementary path continuity monitor transmitter associated with a complementary OPS, wherein the setting of the switch is based on data detected by one or more of the two path continuity monitor receivers on the corresponding path continuity monitor signal.

2. The Optical Protection Switch (OPS) of claim 1, wherein the two path continuity monitor receivers each have a narrow optical bandwidth relative to an overall optical bandwidth of the transmitted input.

3. The Optical Protection Switch (OPS) of claim 2, wherein the two path continuity monitor receivers include a narrowband optical filter, thereby lowering noise contribution to overall received power.

4. The Optical Protection Switch (OPS) of claim 1, wherein the two path continuity monitor receivers are each configured to receive data, and wherein the data received by the two path continuity monitor receivers is tied directly into the switch for control thereof.

5. The Optical Protection Switch (OPS) of claim 1, wherein the path continuity monitor signal is at a wavelength within a gain bandwidth of an optical amplifier but outside of data-bearing channels.

6. The Optical Protection Switch (OPS) of claim 1, wherein the setting of the switch is set to switch based on a detected loss of the corresponding path continuity monitor signal.

7. The Optical Protection Switch (OPS) of claim 1, wherein the path continuity monitor transmitter and the two path continuity monitor receivers are configured to carry data on associated wavelengths with the complementary OPS.

8. The Optical Protection Switch (OPS) of claim 7, wherein, subsequent to a switch, the path continuity monitor transmitter is configured to communicate the switch to the complementary OPS for synchronization of paths using an in-band communication signal.

9. The Optical Protection Switch (OPS) of claim 1, further comprising an optical filter on the transmitted input to block an upstream path continuity monitor signal.

10. The Optical Protection Switch (OPS) of claim 9, wherein in a nested configuration N−1 OPS pairs are provided for protection of N fiber paths.

11. The Optical Protection Switch (OPS) of claim 9, wherein the OPS is in an outer stage of a nested configuration, and wherein the one or more path continuity monitor receivers are configured to receive a path continuity monitor signal from inner stages of the nested configuration.

12. The Optical Protection Switch (OPS) of claim 9, wherein a corresponding path continuity monitor signal for each stage in a nested configuration has unique modulation or frequencies for identification thereof.

13. A method of optical protection switching with an Optical Protection Switch (OPS) comprising:

in the OPS which includes a splitter on a transmit side that receives a path continuity monitor signal from the a continuity monitor transmitter and a transmitted input and splits the path continuity monitor signal and the transmitted input to both a first fiber path and a second fiber path and a receive switch on a receive side with the receive switch set to only one of the first fiber path and the second fiber path, receiving corresponding split path continuity monitor signals two path continuity monitor receivers from a complementary OPS; and based on data detected by one or more of the two path continuity monitor receivers on the corresponding path continuity monitor signal, causing a switch of the receive switch.

14. The method of claim 13, wherein the two path continuity monitor receivers each have a narrow optical bandwidth relative to an overall optical bandwidth of the transmitted input.

15. The method of claim 13, wherein the two path continuity monitor receivers are each configured to receive data, and wherein the data received by the two path continuity monitor receivers is tied directly into the switch for control thereof.

16. The method of claim 13, wherein each of the split path continuity monitor signals is at a wavelength within a gain bandwidth of an optical amplifier but outside of data-bearing channels.

17. The method of claim 13, further comprising:
subsequent to a switch based on a loss of a path continuity signal, communicating the receive switch state to the complementary OPS for synchronization of paths.

18. The method of claim 13, further comprising:
utilizing an optical filter on a transmitted input to block an upstream path continuity monitor signal in a nested configuration.

19. A nested Optical Protection Switch (OPS) system comprising:

N−1 OPS pairs providing protection for N fiber paths, and each OPS including
a splitter connected to a transmitted input and a path continuity monitor transmitter and configured to receive a path continuity monitor signal from the path continuity monitor transmitter and the transmitted input and to output the transmitted input with the path continuity monitor signal to two paths, wherein any upstream path continuity monitor signal is blocked on the transmitter input;

a switch connected to a receiver output and configured to provide one of two receiver inputs each from one of the two paths based on a setting of the switch; and two path continuity monitor receivers, each connected to one of the receiver inputs and configured to detect a corresponding path continuity monitor signal split from a complementary path continuity monitor transmitter associated with a complementary OPS, wherein the setting of the switch is set based on data detected by one or more of the two path continuity monitor receivers on the corresponding path continuity monitor signal.

20. The nested Optical Protection Switch (OPS) system of claim 19, wherein the corresponding path continuity monitor signal is formed from a single source with unique modulated signals sent from the single source over each of the N fiber paths for identification thereof.

* * * * *